Patented June 22, 1954

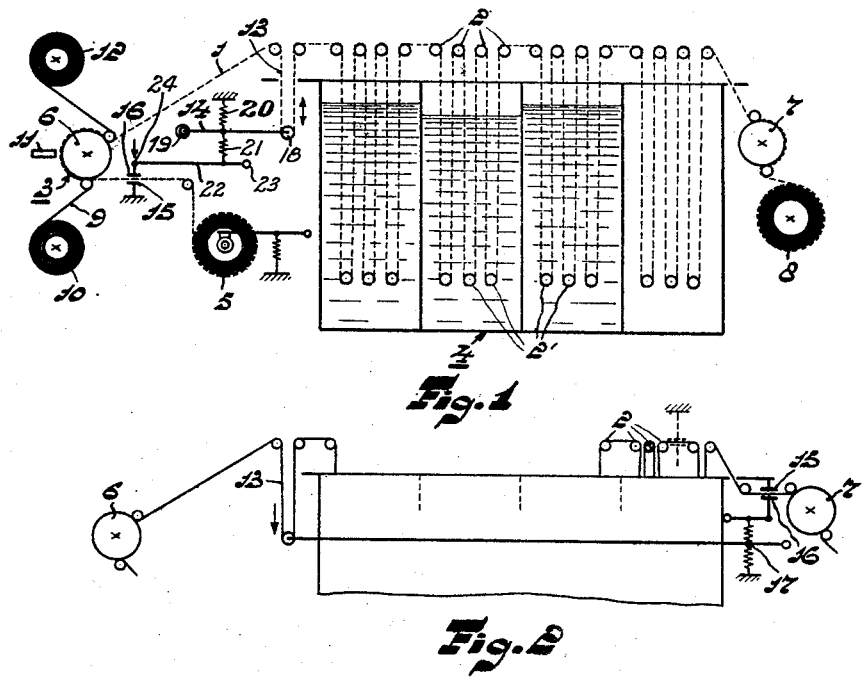

2,681,802

UNITED STATES PATENT OFFICE 2,681,802

DEVICE FOR THE CONVEYANCE OF TAPES WITH THE USE OF ROLLERS

Roelof Vermeulen, Roelof Jan Hendrik Alink, and Julius Goeman Bos, Eindhoven, Netherlands, assignors to Hartford National Bank and Trust Company, Hartford, Conn., as trustee Application February 12, 1949, Serial No. 76,164

Claims priority, application Netherlands April 20, 1948

4 Claims. (Cl. 271—2.3)

This invention relates to devices for conveying tapes with the use of rollers and more particularly thin tapes such, for example, as tapes of regenerated cellulose having a thickness of a few tens of microns which during conveyance are subjected to a certain treatment such, for example, as moistening, drying or heating, and in which the peripheral speed of the roller over which the tape is supplied to the device is at least substantially equal to the peripheral speed of the roller over which the tape is carried-off from the device, the ratio between the said speeds being maintained constant during operation. Devices of this kind are used, for example, for the combined exposure and development of copies of photographic films, the peripheral speed of the roller at the area of exposure of a film having to be equal as accurately as possible to that of the roller over which the film leaves the device, in order to avoid accumulation or rupture of the film in the device according as the amount of material carried-off is insufficient or excessive.

Despite the said precaution in regard to the peripheral speeds of the rollers, a number of difficulties are still encountered. Firstly, it will be unavoidable, independently of the film material to be treated, that different amounts of material are conveyed by the different rollers with prolonged and more particularly with continuous operation of such a device. As a result, the length of a tape between the rollers and more particularly the length of the loops normally occurring in a tape is subject to inadmissible variation which may lead to stagnation in the operation. This is attributable to the fact that it is in practice impossible exactly to equalise the diameters of the rollers over which a tape is supplied to the device and carried-off therefrom, so that the peripheral speeds of the rollers are different. The same difficulty will be encountered not only in devices of the above-mentioned kind for the exposure and development of photographic films but also in the event that image and/or sound films consisting more particularly of regenerated cellulose or other thin material, which films, as a rule, are of considerable length, are required to be moved on in the film photographing or reproducing apparatus over different non-toothed rollers, since the conditions then occurring are similar to those with the above-mentioned devices. The image and sound records provided on the film are required to be moved on synchronously, in which event for structural reasons a determined constant film length between the image and/or sound photographing or reproducing area is required. Since it is in practice impossible exactly to equalize the diameters of the supply roller near the image gate and of the roller near the sound gate and hence the linear speeds of the film at these areas, the portion of the film located between the said points of scanning will, if no precautions are taken vary in length to an undesirable extent more particularly with prolonged operation, although the difference in dimension will be small.

Furthermore, the material to be conveyed may be sensitive to the difference in the state of moisture which occurs during conveyance and the consequent difference in extension of a tape, for example in the dry and the moist state, as is the case when using thin films of regenerated cellulose. The term "extension" of a tape is to be understood here and also hereinafter to mean the permanent extension. The variation in length of a tape which occurs during the moist treatment such, for example, as in a photographic developer will, as a rule, be different and opposite to the variation in length produced during the subsequent drying process, so that, in addition to the aforementioned inconvenience, additional variations in length occur as result of treatment of the tape, which, as previously mentioned, may give rise to serious disturbance.

It is already known to face the said difficulties by controlling the linear speed of a tape. This may be effected either by varying the diameter of the roller, for example with the use of axially movable, conical rollers, or by controlling the speed of rollers of cylindrical shape. Although it is thus possible to avoid unduly large loops in a tape during the transport in the device or that a tape may slacken, it is by these means not possible to ensure that the length of a tape, if varied during conveyance, again acquires its initial value.

In order to meet this inconvenience, the device according to the invention comprises means which react upon variation in length of a loop in the tape formed in the device between the supply-roller and the carrying-off roller and with the use of which the length of the tape on leaving the device is automatically maintained at a determined value by control of the tension of the tape. Owing to the tape being supplied to the device at constant tension, if desired adjustable, which corresponds to a determined extension, since the film is wound off the supply roller at constant tension, the device according to the invention permits of compensating for positive or negative variations in length or for both such variations, to which the tape is subject during its treatment in the device, in that the tension of the tape is varied at a determined area, irrespective of the variation in length being brought about by the difference between the diameters of the rollers, by the difference in extension during the treatment of the tape, or by the combination of both of them.

In the manner described it is possible to ensure, in addition to the result obtained by the conventional speed control, that, for example, the length of a portion of the tape upon entering the device is, controllable within narrow limits, equal to or in a determined proportion to the length of the same portion upon leaving the device. This is of great importance in the development of films of regenerated cellulose on which image and/or sound records have been copied from another film, since if no allowance is made for the variation in length to which such a film portion is subject during development and drying, the positive on being projected will give an unsteady image on the screen, while sound records provided on a film will give rise to undesirable distortion of the sound during reproduction.

According to the invention, the tension is varied to an extent dependent on a loop in the tape formed in the device between the supply roller and the carrying-off roller.

In the conveyance of tapes over plurality of rollers it is known per se to transmit the variation in length of a loop formed in a tape to a braking device, for example, with the use of a lever system, so as to act upon the speed of the rollers. In the device according to the invention the said known method of indication is utilised to control the tension of a tape by varying a frictional force to be exerted on the tape as a function of the variation in length of the loop. Since in the device according to the invention it is ensured that the film upon entering the device has a linear speed as far as possible equal to that of the tape upon leaving the device, variation in the frictional force to be exerted on the tape will only affect the tension of the tape and will not affect its speed.

In the device according to the invention, the tension of a tape on the ascending portion of the roller over which the tape is supplied to the device is advantageously increased with increasing length of the loop, since enlargement of the loop implies that the amount of material supplied to the device is greater than that carried-off therefrom. Since the tape upon entering has a linear speed substantially equal to that upon leaving the device, this implies that the tape upon entering the device comprises per unit-length a mass greater than that of the tape upon leaving the device.

The extension of the tape before entering the device is thus insufficient. The equilibrium may be restored by increasing the tension of the tape before entering the device. Conversely, with decreasing length of the loop, the tension in situ requires to be reduced. It is alternatively possible for the tension of the tape on the ascending portion of the roller over which the tape is carried off from the device to be decreased with increasing length of the loop and to be increased with decreasing length of the loop, since it may also be assumed that, as with increasing length of the loop, the amount of material fed to the device by the supply roller is greater than that carried-off from the device by the carrying-off roller, the portion of the tape located within the device is unduly extended. The tension of the said portion is thus unduly great and requires reduction to restore the equilibrium. In either case it is naturally impossible exactly to equalize the dimension of each portion of the film upon entering and upon leaving the device. However, the difference in length is controllable within very narrow limits with the use of a sensitive regulating device.

The invention will now be explained more fully by reference to the accompanying drawing showing, by way of example, a few embodiments thereof.

Fig. 1 shows a device according to the invention in which a photographic record on a film is copied on a second film of regenerated cellulose having a thickness of a few tens of microns by subjecting the film successively to exposure, development and drying in one continuous process.

Fig. 2 shows a similar device in which the tension control is effected inside the machine.

Referring to Fig. 1, in a device according to the invention, a film 1 of regenerated cellulose having a thickness of a few tens of microns is led, in the form of loops over a number of untoothed rollers and is subjected successively to a series of treatments, such as exposing, washing, developing, fixing, drying, etc., after which the film, whilst retaining its initial length, is carried off from the device, so that after leaving the device the film is immediately ready, for example, for projection. The device comprises an exposure apparatus 3 and a machine 4, in which the film is developed and dried and led over two series of parallel rollers 2 and $2^1$, the rollers 2 of one series being located in a plane above the rollers $2^1$ of the other series. The film 1 on which a copy must be made is wound with constant tension off a delivery reel 5 and supplied by a roller 6 of the exposure apparatus to the device at a linear speed substantially equal to that at which it is carried-off from the device by a measuring roller 7 of the developing machine, the film being wound on a reel 8. A negative film 9 of which the record is to be copied on the film 1, is wound off a reel 10, subsequently led, together with the film 1, over the roller 6 where the exposure takes place with the aid of an objective 11, and wound on a reel 12.

Since the diameter of the exposure roller 6 is in practice not exactly equal to that of the measuring roller 7, as a result of which the linear film speeds on the said rollers are slightly different, and, furthermore, during the wet and the subsequent dry treatment, the film 1 is subject to different variations in length, the exposure roller 6 will either supply to the device an amount of material greater than that carried-off from the device by the measuring roller 7, so that there will be accumulation of material in the device, or the amount of material supplied by the exposure roller 6 is smaller than that carried-off by the measuring roller 7, which ultimately leads to rupture of the film.

According to the invention in order to obviate this disadvantage, use is made of the variation in length of a loop 13 formed within the device between the driven exposure roller 6 and the measuring roller 7, with the aid of which the length of the tape on leaving the device is automatically maintained at a determined value. If, for the time being, it is assumed that the linear speeds of the film upon entering and upon leaving the device are equal due to the diameters of the exposure and measuring rollers being exactly the same, any variation in the length of the film portion comprised in the device between the said rollers will become manifest as a variation in length of the said loop. The loop may be provided in the device at any arbitrary area, in the embodiment under consideration it is provided between the exposure apparatus 3 and the machine 4.

The variation in length which a film of regenerated cellulose has undergone after moistening and subsequent drying and which is the resultant of opposite variations in length produced during the said treatments is intimately connected with the internal state of tension and the corresponding extension of the film before its treatment. The term "extension" of the film is to be understood here to mean the permanent extension. Variation in the state of tension of the film, before the treatment in the device takes place, results after treatment in a variation in length corresponding to this state of tension. Owing to the state of tension of the film before entering the device, hence of the film portion ascending over the exposure roller 6 being controlled as a function of the variation in length of the loop 13, the length of the film portion leaving the device may be automatically maintained at a determined value. If an image record is provided on the negative film 9, each image visible on the film upon leaving the device, will have a length equal to that of the image immediately after the exposure roller 6 has been passed, that is to say equal to the length of the corresponding image on the negative film which was only latently present on the film. If the length of the film 13 increases, this implies that the amount of material supplied to the device by the exposure roller 6 is greater than that carried-off therefrom by the measuring rollers 7, since the linear speeds of the film on the said rollers are equal, as was initially assumed. However, this is possible only if the film, before entering the device has been insufficient, by extended that is to say if the film is slightly too thick. If the tension of the film before entering the device, hence of the portion ascending over the exposure roller 6 is increased, the initial extension of the film at this area is increased. Upon entering, the film is then slightly thinner so that a smaller amount of material is supplied by the exposure roller 6 and the equilibrium between the amount of material supplied to the device and that carried-off therefrom may be restored. Conversely, a decrease in length of the loop 13 implies that the amount of material supplied to the device by the exposure roller 6 is smaller than that carried-off therefrom by the measuring roller 7. The extension of the film before entering the device is in this case unduly great, the film being slightly too thin. Decreasing the tension of the film portion ascending over the exposure roller 6 will result in the extension of the film in situ acquiring a lower value, so that more material is supplied to the device and the film locally becomes slightly thicker, so that the equilibrium in the device is again restored.

If the diameters of the exposure roller 6 and of the measuring roller 7 are different, which will always be the case in practice, the consequent variation in length of the film portion extending between the said rollers within the device, which variation is independent of the treatment to which the film is subjected, may likewise be neutralised in the manner mentioned before. It will only be possible to ensure that the variations are maintained within determined limits, as is the case with any control of a varying magnitude to a determined value. Consequently, the initial length can never be restored completely, but variations will be controllable within very narrow limits.

The tension control is effected in that, with the use of a resilient lever system 14, the variations in length of the loop 13 are converted into variations in the frictional force exerted on the film by two felt plates 15, 16, of which one (15) is fixed and the other (16) is movable and between which the film is led. In Fig. 1, the felt plates 15, 16 are provided at the film portion ascending over the exposure roller 6 and hence before the film 1 enters into the device. As has already been explained in the foregoing, the tension of the film in situ requires to be increased or decreased if the length of the loop increases or decreases.

In the operation of the present device the loop 13 will be enlarged when there is a decrease in tension of the film between the rollers 6 and 7. In this event the working of the brake 15, 16 will be increased. This operation of the brake 15, 16 is accomplished by means of a roller 18 in the loop 13, said roller moving in a downward direction. This movement results in the clockwise rotation of lever 14 about its center of rotation 19. A second lever 22 rotatably mounted about its center of rotation 23 will also move in a downward direction due to the action of spring 21 which is arranged between levers 14 and 22 respectively. Consequently the end 24 of lever 22 which is connected to the brake member 16 will move in a downward direction which results in an increase in braking action of brake 15, 16. This increase in braking will cause the film strip between the roller 6 and the brake 15, 16 to be stretched. This stretching results in that the film material present per centimeter of film length is less, thus less film material is carried by the roller 6 thereby causing the film between the roller 6 and brake 15, 16 to be less stretched. After the less-stretched film passes the roller 6 the film adapts the normal tension of the film existing between the rollers 6 and 7. Accordingly, the film material transported by the roller 7 will remain the same. It is apparent, therefore, that by stretching the film between the brake 15, 16 and the roller 6 that not only less material per centimeter of the film length is moved to the machine 4, but also the length of the film material transported after the roller 6 in the direction of said machine will be less.

Fig. 2 shows a device similar to that of Fig. 1, but here the tension control, instead of being effected before the film enters the device, takes place before the film leaves the device and this on the film portion ascending over the measuring roller. As has already been explained before, an increase in length of the loop 13 is accountable from the fact that the film is unduly extended within the device, so that the tension of that portion of the film which ascends over the measuring roller is required to be decreased to restore the equilibrium. For this purpose fixed and movable felt plates 15 and 16 respectively are provided at the said area, the film being led therebetween. An increase or a decrease in length of the loop 13 is converted by a lever system 17 into a decrease or increase of the tension in the film. As an alternative, the device for the tension control, instead of being provided at the film portion ascending over the measuring roller, may be provided at that portion of the film which is dried, for example, at the area at which the felt plates 15, 16 are indicated by dotted lines in Fig. 2.

What we claim is:

1. Apparatus for conveying a tape member subject to elongation proportional to tension values thereof, comprising a first untoothed driver friction roller member engaging said tape member substantially without slip, a second untoothed driver friction roller member engaging said tape member substantially without slip, said second roller member being spaced from the said first roller member and having a peripheral speed substantially equal to the peripheral speed of said first roller member, a tension value determining member arranged to be coupled to said tape member between said first and second roller members, and a tension regulating member coupled to said tension value determining member and arranged to engage said tape member at a portion thereof prior to one of said roller members to vary the tension and thereby the length of said tape member at the said prior portion thereof.

2. Apparatus for conveying a tape member subject to elongation proportional to tension values thereof, comprising a first untoothed driver friction roller member engaging said tape member substantially without slip, a second untoothed driver friction roller member engaging said tape member substantially without slip, said second roller member being spaced from the said first roller member and having a peripheral speed substantially equal to the peripheral speed of said first roller member, a tension value determining member arranged to be coupled to said tape member between said first and second roller members, and a tension regulating member coupled to said tension value determining member and arranged to frictionally engage said tape member at a portion thereof prior to one of said roller members to vary the tension and thereby the length of said tape member at the said prior portion thereof.

3. Apparatus for conveying a tape member subject to elongation proportional to tension values thereof, comprising a first untoothed driver friction roller member engaging said tape member substantially without slip, a second untoothed driver friction roller member engaging said tape member substantially without slip, said second roller member being spaced from the said first roller member and having a peripheral speed substantially equal to the peripheral speed of said first roller member, a reel for supplying said tape member to said first roller member, a tension value determining member arranged to be coupled to said tape member at a loop portion thereof between said first and second roller members, and a tension regulating member coupled to said tension value determining member, said tension regulating member being arranged to engage said tape member at a portion thereof between said reel and said first roller member to vary the tension and thereby the length of said tape member at the said prior portion thereof proportional to the length of the said loop portion.

4. Apparatus for conveying a tape member subject to elongation proportional to tension values thereof, comprising a first untoothed driver friction roller member engaging said tape member substantially without slip, a second untoothed driver friction roller member engaging said tape member substantially without slip, said second roller member being spaced from the said first roller member and having a peripheral speed substantially equal to the peripheral speed of said first roller member, a tension value determining member arranged to be coupled to said tape member at a loop portion thereof between said first and second roller members, and a tension regulating member coupled to said tension value determining member and arranged to engage said tape member at a portion thereof between said loop portion and said second roller member, said tension regulating member being responsive to the tension value determined by said tension value determining member in such a manner that the tension on said tape member is increased when an increase in tension is determined and the tension on said tape measure is decreased when a decrease in tension is determined and thereby varying the length of said tape member at the said prior portion thereof proportional to the length of said loop portion.

References Cited in the file of this patent

UNITED STATES PATENTS

| Number | Name | Date |
|---|---|---|
| 1,906,211 | Junker | Apr. 25, 1933 |
| 1,910,154 | Eitzen | May 23, 1933 |
| 1,957,148 | Oehmichen | May 1, 1934 |
| 2,475,691 | Bonebrake | July 12, 1949 |

FOREIGN PATENTS

| Number | Country | Date |
|---|---|---|
| 202,265 | Switzerland | Apr. 1, 1939 |